May 6, 1941. J. H. ARNST 2,240,879
ELECTRIC LIFT AND DEPTH CONTROL DEVICE FOR FARM IMPLEMENTS
Filed May 29, 1940 2 Sheets-Sheet 1

John H. Arnst,
INVENTOR

BY Victor J. Evans & Co.
ATTORNEYS

May 6, 1941.  J. H. ARNST  2,240,879
ELECTRIC LIFT AND DEPTH CONTROL DEVICE FOR FARM IMPLEMENTS
Filed May 29, 1940  2 Sheets-Sheet 2
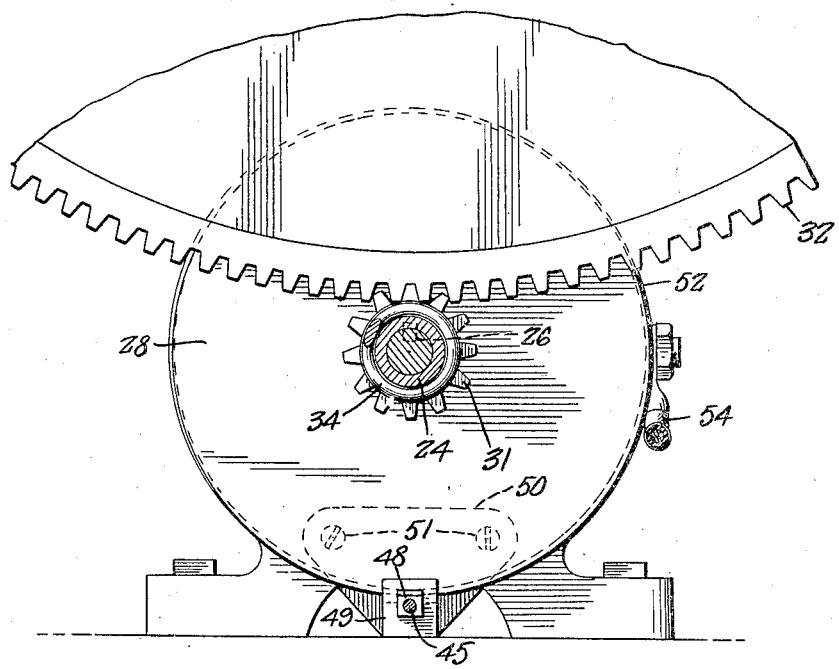
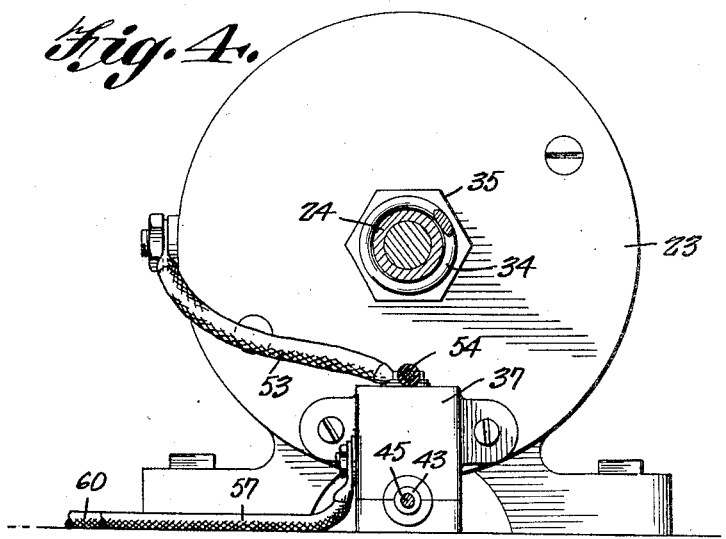
John H. Arnst, INVENTOR
BY Victor J. Evans & Co.
ATTORNEYS Patented May 6, 1941

2,240,879

UNITED STATES PATENT OFFICE 2,240,879

ELECTRIC LIFT AND DEPTH CONTROL DEVICE FOR FARM IMPLEMENTS

John H. Arnst, Valier, Mont.

Application May 29, 1940, Serial No. 337,921

3 Claims. (Cl. 97—50)

This invention relates to an electric lift and depth control device for farm implements.

An object of the invention is to provide apparatus for adjusting the penetration of cultivator shovels, plow disks, and the like of farm implements, and for raising and lowering the same to respective released and operative positions, through the medium of one reversible motor or a pair of electric motors, selectively operated and connected to the beam or other part of the implement.

A further object is to provide, in apparatus of this character, means for limiting the operation of the motors automatically.

A further object is to provide, in apparatus of this character, a yielding clutch to permit the ground penetrating elements to yield upwardly over an obstruction and prevent breakage to the parts.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 4 is a cross sectional view of the device taken on the line 4—4 of Figure 3.

Figure 5 is a diagrammatic view of the electrical connections of the device.

Figure 1:
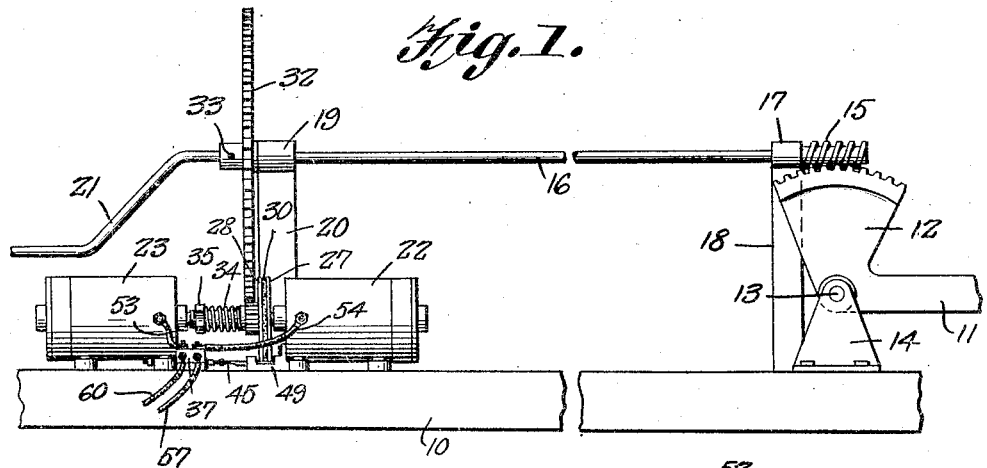
Figure 1 is a side elevation of an electric lift and depth control device constructed in accordance with the invention.

Referring now to the drawings in which like characters of reference designate similar parts in the various views, 10 designates a support which may be the beam of a cultivator, a disk plow, or other ground working farm implement. Ordinarily, for raising and lowering the gangs or disks, a lever 11 is provided having a segment rack 12 on one end pivoted as shown at 13 to a bracket 14 carried by the beam. The rack meshes with a worm 15 carried by a shaft 16 which is journaled in a bearing 17 carried by a bracket arm 18 which is mounted on the support 10. The opposite end of the shaft is journaled in a bearing 19 carried by a bracket arm 20 which is secured at the bottom to the support. The bracket arm terminates in a crank handle 21 for turning the shaft to raise and lower the ground penetrating parts connected to the lever 11.

Figure 2:
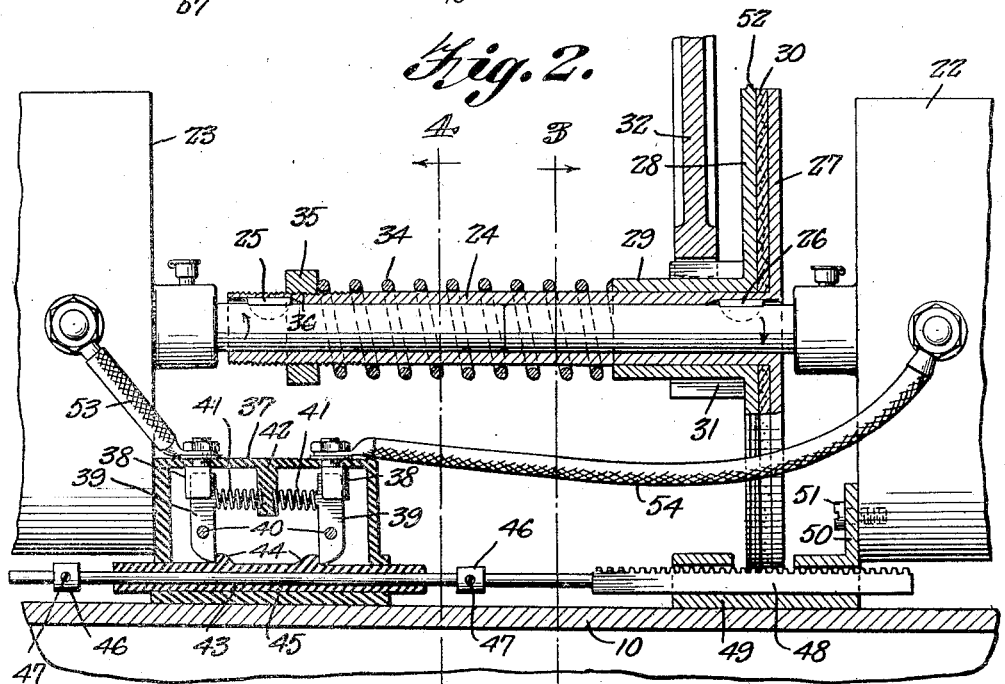
Figure 2 is a longitudinal sectional view of the device with parts in elevation and parts removed.
Figure 3:
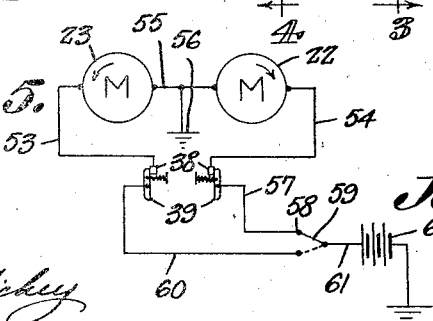
Figure 3 is a cross sectional view taken on the line 3—3 of Figure 2.

For rotating the shaft 16 by other than manual means a pair of electric motors 22 and 23 are mounted in alined spaced relation on the support 10. The shafts of the motors are connected by a sleeve 24, best shown in Figure 2, keyed as shown at 25 and 26 to the respective shafts of the motors. One of the motors is adapted to rotate in a clockwise direction and the other motor in a counter-clockwise direction but only one of the motors is driven at a time, thereby rotating the other motor idly.

A clutch disk 27 is formed integral with the sleeve 24 and interposed between this clutch disk and a clutch disk 28 having a hub 29 loose on the sleeve is a friction clutch disk 30. The hub 29 is equipped with gear teeth 31 which mesh with a large gear 32 which is fixed to the shaft 16 by a pin 33, or other connector.

A helical spring 34 surrounds the sleeve 24 and bears at one end against the end of the hub 29 and at the other end bears against an adjusting nut 35 which is screw threadedly engaged with the sleeve 24 as shown at 36. Adjustment of the nut varies the pressure of the spring upon the hub 29 and disk 28.

When one of the motors is actuated while the other idles, the clutch disk 27 will be turned in a corresponding direction to rotate the gear 32 and either raise or lower the ground penetrating tools of the implement according to the direction of rotation of the motor.

For limiting rotation of either motor a pair of limit switches are mounted in a casing 37 which is secured to the support 10 in any preferred manner. The limit switches are each of the blade switch type comprising a fixed switch contact 38 which receives one end of a blade 39 which is pivoted intermediate its ends as shown at 40 in the casing 37. A pair of helical springs 41 are confined between an abutment 42 which depends from the top of the casing and both switch blades 39.

A sleeve 43 of insulating material is slidably mounted in openings in the ends of the casing and is equipped with a pair of spaced lugs 44 which engage the opposed end of the blades 39 of the switches for moving either switch to open circuit position, selectively.

A shift rod 45 extends longitudinally and loosely through the sleeve 43. Outside of the ends of the sleeve the shift rod is equipped with stop collars 46 which are held in adjusted position on the rod by set screws 47. When the rod is moved endwise one of the collars will contact with the respective end of the insulating sleeve 43 and move the sleeve endwise to open a respective limit switch.

The rod is equipped with a rack bar 48 which is slidably fitted in a guide bearing 49 having an initial lug 50 which is secured to one of the motors by a set screw 51, or other connector. The rack bar 48 meshes with gear teeth 52 formed on the periphery of the clutch disk 28. Thus when the clutch disk is turned in one direction the rack bar 48 will be moved endwise either to the right or to the left according to which one of the motors is energized to shift the rod 45 and move the sleeve 43 to move one of the limit switches to open circuit position.

As best shown diagrammatically in Figure 5, the fixed contact of one of the limit switches is connected by a conductor wire 53 to one of the motors and the fixed contact of the other limit switch is connected by a conductor wire 54 to the other motor. The free terminals of both motors are connected together by a wire 55 which is grounded as shown at 56. The blade of one of the limit switches is connected by a wire 57 to one pole 58 of a selector switch 59. The other pole of the switch is connected by a wire 60 to the other limit blade. The manual selector switch 59 is connected by a wire 61 to the battery 62, generator, or other source of electricity which ordinarily may be carried by the tractor to which the farm implement is attached.

In operation, when the manual selector switch 49 is moved to circuit closing position against the terminals of one of the limit switch circuit wires both motors rotate in a clockwise direction, one being energized and the other idling, and lift the ground penetrating instruments for a fraction or all of the way out of the ground. When the manual selector switch is moved to circuit closing position against the terminal of the circuit wire of the other limit switch the motors rotate in a counter-clock-wise direction, one of the motors being actuated and the other idling to lower the ground penetrating tools a fraction or all of the way into the ground.

From the above description it is thought that the construction and operation of the invention will be fully understood without further explanation.

What is claimed is:

1. An electric lift and depth control device comprising, a support, a pair of electric motors on the support having their shafts in alined spaced relation, a sleeve fixed to and connecting both shafts as a unit, one of the motors being adapted to rotate in a clockwise direction and the other in a counter-clockwise direction, disk clutch means connected to one of the shafts having gear teeth, means for raising and lowering ground penetrating instruments disposed adjacent to one of the motors, a shaft connected to said means for actuating the means, a gear on said shaft meshing with said gear teeth, circuits for the motors, limit switches in the circuits for opening a respective motor circuit at a pre-determined time, means connected to the loose clutch disk for actuating the limit switches alternately, a manually operable selector switch controlling said circuits, and a source of electricity connected to said circuits.

2. An electric lift and depth control device comprising, a support, a pair of electric motors on the support having their shafts in alined spaced relation, a sleeve fixed to and connecting both shafts as a unit, one of the motors being adapted to rotate in a clockwise direction and the other in a counter-clockwise direction, a clutch disk fixed to one of the shafts, a clutch disk loose on the sleeve having gear teeth, a friction disk between both clutch disks, a helical spring surrounding the sleeve and bearing against the loose clutch disk, an adjusting nut on the sleeve regulating the tension of the spring, means for raising and lower ground penetrating implements disposed adjacent to one of the motors, a shaft connected to said means for actuating the means, a gear on said shaft meshing with said gear teeth, circuits for the motors, limit switches in the circuits for opening a respective motor circuit at a pre-determined time, means connected to the loose clutch disk for actuating the limit switches alternately, a manually operable selector switch controlling said circuit, and a source of electricity connected to said circuits.

3. An electric lift and depth control device comprising, a support, a pair of electric motors on the support having their shafts in alined spaced relation, a sleeve fixed to and connecting both shafts as a unit, one of the motors being adapted to rotate in a clockwise direction and the other in a counter-clockwise direction, disk clutch means connected to one of the shafts having gear teeth, means for raising and lowering ground penetrating instruments disposed adjacent to one of the motors, a shaft connected to said means for actuating the means, a gear on said shaft meshing with said gear teeth, circuits for the motors, blade switches in said circuits spring-pressed normally to closed circuit position, an insulating sleeve mounted to slide endwise past the switches and having spaced lugs adapted to move the switches to open circuit position, a rod slidably mounted in the insulating sleeve, stop collars adjustably mounted on the rod spaced from the ends of the sleeve for moving the sleeve when the rod is moved, means connecting the rod to be actuated by the clutch means, a manually operable selector switch controlling said circuits, and a source of electricity connected to said circuits.

JOHN H. ARNST.